(12) United States Patent
Sawyer et al.

(10) Patent No.: US 11,840,167 B2
(45) Date of Patent: Dec. 12, 2023

(54) FAILSAFE PARKING BRAKE MANUAL OVERRIDE

(71) Applicant: Howe & Howe Inc., Waterboro, ME (US)

(72) Inventors: Zachary Edward Sawyer, Alfred, ME (US); Forrest Joel Tripp, Saco, ME (US)

(73) Assignee: Howe & Howe Inc., Waterboro, ME (US)

( * ) Notice: Subject to any disclaimer, the term of this patent is extended or adjusted under 35 U.S.C. 154(b) by 208 days.

(21) Appl. No.: 17/193,055

(22) Filed: Mar. 5, 2021

(65) Prior Publication Data

US 2021/0277970 A1    Sep. 9, 2021

Related U.S. Application Data

(60) Provisional application No. 62/986,143, filed on Mar. 6, 2020.

(51) Int. Cl.
*B60P 1/02* (2006.01)
*B62D 21/09* (2006.01)
(Continued)

(52) U.S. Cl.
CPC .............. *B60P 1/02* (2013.01); *A62C 27/00* (2013.01); *A62C 31/00* (2013.01); *A62C 31/005* (2013.01);
(Continued)

(58) Field of Classification Search
CPC ... B60P 1/02; B60P 3/00; A62C 27/00; A62C 31/00; B60K 13/02; B60T 7/12;
(Continued)

(56) References Cited

U.S. PATENT DOCUMENTS 1,418,434 A * 6/1922 Finch .................... B61H 9/006
    303/76
2,041,065 A * 5/1936 Hemphill ................ B60T 11/00
    74/577 M
(Continued)

FOREIGN PATENT DOCUMENTS

DE         3015029        10/1980
GB         2019970        11/1979
(Continued)

*Primary Examiner* — Robert A. Siconolfi
*Assistant Examiner* — James K Hsiao
(74) *Attorney, Agent, or Firm* — BainwoodHuang (57) ABSTRACT

An overridable failsafe brake apparatus for a vehicle is provided. The overridable failsafe brake apparatus includes (a) a lever accessible from outside the vehicle, the lever being operable at a first position and a second position; (b) a brake; and (c) a spring having a first end coupled to the lever and a second end coupled to the brake. (d) The lever disposed in the first position is configured to induce tension in the spring that enables the brake to be activated, and the lever disposed in the second position is configured to reduce tension in the spring to disable the brake from being engaged. A method of operating an overridable failsafe brake apparatus for a vehicle and a vehicle including an overridable failsafe brake apparatus are also provided.

17 Claims, 4 Drawing Sheets

(51) Int. Cl.
  *B60K 13/02* (2006.01)
  *B60T 7/12* (2006.01)
  *F02M 35/10* (2006.01)
  *F02M 35/104* (2006.01)
  *F16D 65/28* (2006.01)
  *A62C 27/00* (2006.01)
  *A62C 31/00* (2006.01)
  *B60P 3/00* (2006.01)
  *B25J 5/00* (2006.01)
  *B25J 11/00* (2006.01)
  *B62D 55/06* (2006.01)
  *F16D 121/16* (2012.01)
  *B60P 3/16* (2006.01)

(52) U.S. Cl.
  CPC ............ *B25J 5/005* (2013.01); *B25J 11/008* (2013.01); *B60K 13/02* (2013.01); *B60P 3/00* (2013.01); *B60T 7/12* (2013.01); *B62D 21/09* (2013.01); *B62D 55/06* (2013.01); *F02M 35/104* (2013.01); *F02M 35/10242* (2013.01); *F16D 65/28* (2013.01); *B60P 3/16* (2013.01); *F16D 2121/16* (2013.01)

(58) Field of Classification Search
  CPC ............ B62D 21/09; F02M 35/10242; F02M 35/104; F16D 65/28; F16D 2121/16
  See application file for complete search history.

(56) References Cited

U.S. PATENT DOCUMENTS

| | | | | |
|---|---|---|---|---|
| 2,211,025 A * | 8/1940 | Parkes | B60T 13/581 | 303/18 |
| 2,734,590 A * | 2/1956 | Hays, Jr. | B60T 7/12 | 188/106 R |
| 2,960,194 A * | 11/1960 | Stromberg | B60T 7/20 | 188/112 R |
| 3,031,036 A * | 4/1962 | Meyers | B60T 17/083 | 188/106 R |
| 3,516,519 A * | 6/1970 | Besoyan | F16D 49/08 | 188/162 |
| 3,597,016 A * | 8/1971 | Gachot | B60T 13/36 | 188/67 |
| 3,638,766 A * | 2/1972 | Besoyan | B60T 1/067 | 188/106 P |
| 3,834,767 A * | 9/1974 | Bullinger | B60T 7/20 | 303/2 |
| 3,880,262 A * | 4/1975 | Besoyan | B60T 1/067 | 188/106 P |
| 3,895,683 A * | 7/1975 | Lang | G01P 15/08 | 188/112 A |
| 4,316,418 A * | 2/1982 | Hindin | B61H 9/00 | 105/215.2 |
| 4,501,451 A * | 2/1985 | Reynolds | B60T 15/041 | 303/56 |
| 4,795,002 A * | 1/1989 | Burgei | B60T 11/046 | 188/106 R |
| 4,917,354 A * | 4/1990 | Chambers | F16K 5/204 | 251/163 |
| 5,067,366 A * | 11/1991 | Gandiglio | B60T 13/746 | 74/625 |
| 5,113,977 A * | 5/1992 | Ridings | B62B 5/04 | 280/47.27 |
| 5,826,517 A * | 10/1998 | Larson, Jr. | B61D 3/184 | 105/4.3 |
| 6,241,057 B1 | 6/2001 | Hiatt | | |
| 6,308,804 B1 | 10/2001 | Roberts | | |
| 6,360,859 B1 * | 3/2002 | Angerfors | F16D 65/44 | 74/102 |
| 6,386,338 B1 | 5/2002 | Powrozek | | |
| 6,655,504 B2 * | 12/2003 | Glovatsky | F16D 65/18 | 188/72.1 |
| 6,681,900 B2 * | 1/2004 | Wang | B60T 7/107 | 74/625 |
| 6,758,536 B2 * | 7/2004 | Jacob | B60T 13/263 | 303/123 |
| 6,848,545 B2 * | 2/2005 | Scheuring, III | B60T 13/746 | 192/69.71 |
| 6,886,508 B1 * | 5/2005 | Luffy | F01M 3/00 | 123/73 AD |
| 7,234,785 B1 * | 6/2007 | McCann | B60T 8/4809 | 303/3 |
| 7,263,928 B1 * | 9/2007 | Holden | B65B 13/06 | 100/29 |
| 7,765,049 B2 * | 7/2010 | Potter | B60T 7/10 | 192/219.6 |
| 8,235,181 B2 | 8/2012 | Sano et al. | | |
| 9,352,735 B2 * | 5/2016 | Lalone | B60T 15/46 | |
| 11,052,892 B2 | 7/2021 | Dieckmann et al. | | |
| 2002/0020587 A1 * | 2/2002 | Song | B60T 1/005 | 188/18 A |
| 2002/0162709 A1 * | 11/2002 | Drennen | F16D 65/18 | 188/72.1 |
| 2006/0081739 A1 * | 4/2006 | Meissner | B60S 9/08 | 248/161 |
| 2007/0125054 A1 * | 6/2007 | Dong | F16D 49/16 | 56/11.3 |
| 2008/0179144 A1 | 7/2008 | Sommerfeld et al. | | |
| 2008/0251327 A1 * | 10/2008 | Huber | B60T 17/08 | 188/33 |
| 2009/0205912 A1 * | 8/2009 | Park | F16D 65/28 | 188/156 |
| 2010/0294601 A1 * | 11/2010 | Kraus | F16D 55/2245 | 188/72.2 |
| 2011/0169389 A1 * | 7/2011 | Jeffries | A47B 95/02 | 292/336.3 |
| 2014/0231192 A1 * | 8/2014 | Asano | B61H 1/00 | 188/74 |
| 2015/0090064 A1 * | 4/2015 | Koziol | B61H 13/04 | 74/490.15 |
| 2015/0090541 A1 * | 4/2015 | Koziol | B60T 7/104 | 188/153 R |

FOREIGN PATENT DOCUMENTS

| | | |
|---|---|---|
| GB | 2072776 | 10/1981 |
| WO | 2020098058 A1 | 5/2020 |

* cited by examiner

FAILSAFE PARKING BRAKE MANUAL OVERRIDE

BACKGROUND

1. Field

This disclosure relates generally to vehicle brakes, and more particularly to a manual override for a failsafe parking brake.

2. Description of Related Art

Parking breaks are common features of many vehicles. Certain vehicles apply parking brakes automatically, such as whenever the vehicles are turned off. For example, a firefighting robot called "Thermite" is available from Howe & Howe, Incorporated of Waterboro, ME. The robot incorporates a failsafe brake, which engages automatically whenever the robot is turned off or whenever it loses power, thus ensuring that the robot fails to a safe state.

SUMMARY

Failsafe brakes can present a challenge when moving a vehicle that has lost power. For example, special equipment may be needed to tow a vehicle whose brakes are locked. Some systems provide brake overrides to address this challenge.

Unfortunately, prior brake overrides require special tools and/or are contained within locked compartments of a vehicle, making them difficult to access and operate. What is needed is an override for a failsafe brake that can be operated from outside the vehicle without requiring special tools.

An improved technique addresses this need, in whole or in part, by providing a manual lever accessible from outside of a vehicle. The lever is user-operable between a first position and a second position. When the lever is in the first position, the failsafe brake behaves normally, engaging when the vehicle is powered off or loses power and disengaging when power is restored. But when the lever is in the second position, the failsafe brake is defeated, remaining disengaged even when there is no power.

In some examples, the vehicle includes a powered actuator and a spring, both of which are coupled to a brake coupling. The actuator is configured to exert a positive force on the brake coupling, tending to release the brake, but the spring is configured to exert a negative force on the brake coupling, tending to apply the brake. When the actuator is powered, the positive force from the actuator exceeds the negative force from the spring, causing the brake to be released. But when power is lost, the negative force from the spring becomes greater, causing the brake to be applied.

In some arrangements, the spring has a first end coupled to the brake coupling and a second end coupled to the manual lever. When the lever is placed in the first position, the second end of the spring is relatively far from the brake coupling, such that the spring is able to provide the negative force needed to engage the brake when the actuator loses power. The failsafe brake thus operates normally. But when the lever is placed in the second position, the second end of the spring is closer to the brake coupling, such that the spring becomes unable to provide the requisite negative force. The actuator may lose power, but the spring is unable to apply the brake. The failsafe brake is thus defeated.

In some arrangements, the actuator includes a body that contains a moveable piston. The piston has a distal end coupled to the brake coupling. The actuator is configured to extend the piston from the body when the actuator is powered but to allow the piston to be retracted into the body when the actuator is not powered.

In some examples, the actuator includes a hydraulic cylinder.

In some examples, the body of the actuator is coupled to a chassis structure of the vehicle, e.g., via a pin joint.

In some arrangements, the spring is arranged in parallel with the piston, with the piston configured to push the brake coupling in one direction and the spring configured to pull the brake coupling in the opposite direction.

In some arrangements, the manual lever extends through an exterior wall of the vehicle and is moveable between the first position and the second position within a channel formed within the exterior wall. In some examples, the channel has a continuous J shape having first and second ends corresponding to the first and second positions. The channel is angled such that the spring tends to pull the shaft into the first end of the channel in the first position and tends to pull the shaft into the second end of the channel in the second position.

In some examples, the shaft attaches internally to a chassis structure of the vehicle, e.g., via a ball joint.

In some examples, the brake coupling includes a brake lever having a proximal end coupled to a brake shaft and a distal end coupled to the spring and piston via a bracket. The brake shaft is rotatable in one angular direction to engage the brake and in an opposite angular direction to release the brake.

In some arrangements, multiple instances of the braking structures and override mechanism as described above are provided for respective brakes in the vehicle. According to some examples, the above-described equipment is housed within chassis pods disposed on sides of the vehicle.

Certain embodiments are directed to a mechanism for overriding a failsafe brake in a vehicle. Other embodiments are directed to a vehicle having an override for a failsafe brake. Still other embodiments are directed to a method of overriding a failsafe brake in a vehicle.

In one embodiment, an overridable failsafe brake apparatus for a vehicle is provided. The overridable failsafe brake apparatus includes (a) a lever accessible from outside the vehicle, the lever being operable at a first position and a second position; (b) a brake; and (c) a spring having a first end coupled to the lever and a second end coupled to the brake. (d) The lever disposed in the first position is configured to induce tension in the spring that enables the brake to be activated, and the lever disposed in the second position is configured to reduce tension in the spring to disable the brake from being engaged. A method of operating an overridable failsafe brake apparatus for a vehicle and a vehicle including an overridable failsafe brake apparatus are also provided.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION OF THE INVENTION

Embodiments are directed to techniques for providing a manual lever accessible from outside of a vehicle. The lever is user-operable between a first position and a second position. When the lever is in the first position, the failsafe brake behaves normally, engaging when the vehicle is powered off or loses power and disengaging when power is restored. But when the lever is in the second position, the failsafe brake is defeated, remaining disengaged even when there is no power.

Figure 1:
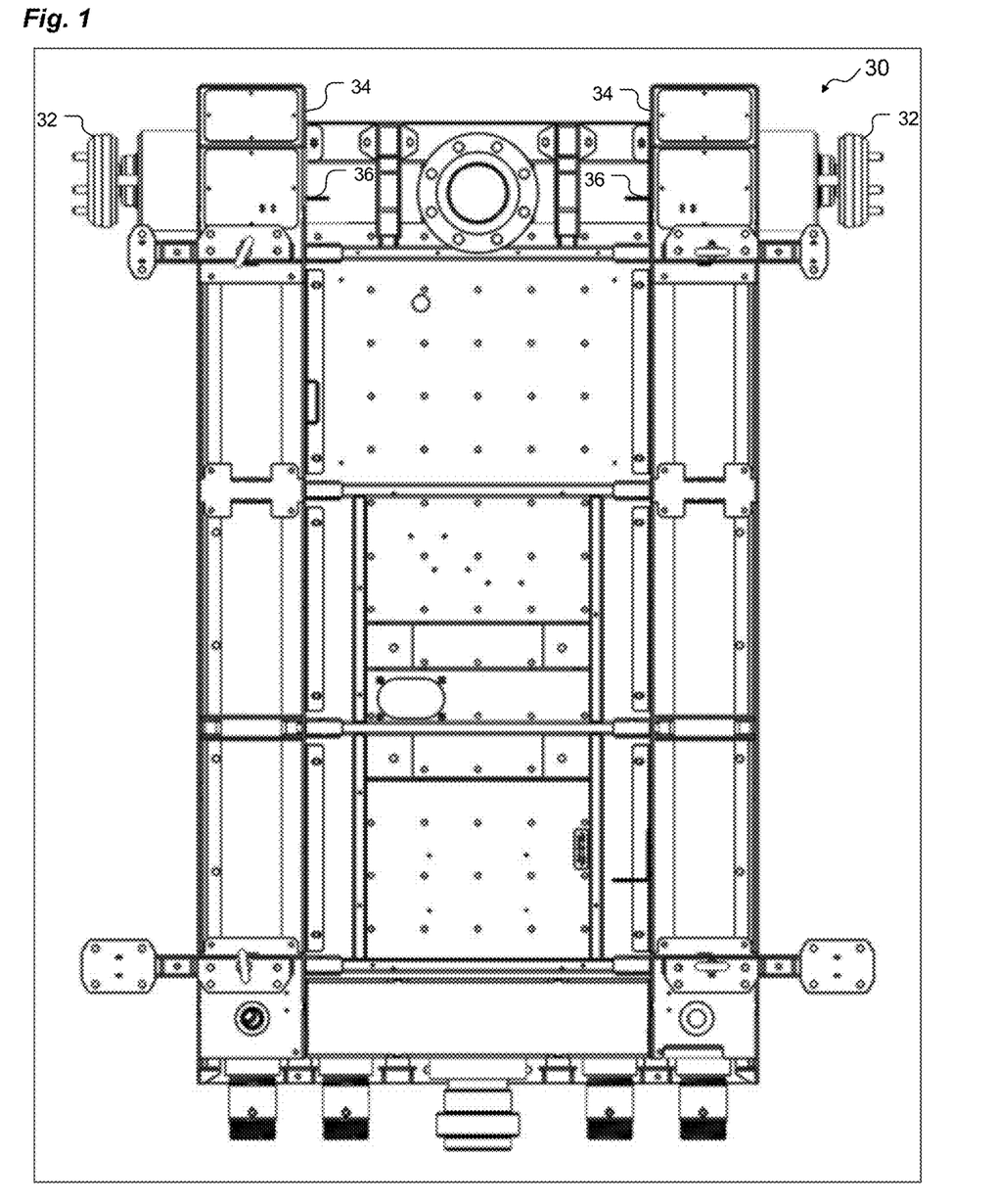
FIG. 1 is drawing of an example vehicle in accordance with various embodiments.

Firefighting robots, such as the vehicle 30 depicted in FIG. 1, are equipped with a failsafe parking brake system. In the event that the vehicle 30 loses power, the brakes are applied and the vehicle is brought to a stop for safety. If the vehicle 30 was disabled and not able to move under its own power, the braking system would need to be disabled so that the vehicle 30 could be towed to a safe location for service. This should ideally be something anyone could do from the outside of the vehicle 30 without the need for tools.

When the vehicle 30 is on, the brakes are disengaged via a hydraulic cylinder 64 (see FIGS. 2A, 2B, 3A, 3B, and 4). When the vehicle 30 shuts down, it loses hydraulic pressure and a spring 46 (see FIGS. 2A, 2B, 3A, 3B, and 4) applies the brakes to stop the vehicle 30. One way to disengage the brakes following a shutdown is to remove the tension from the spring 46. This is accomplished via a manual shaft 36 on a pivot point guided by a cutout in a side wall 34 of the vehicle 30. There is no requirement for tools, and the failsafe brakes can be deactivated in a matter of seconds from outside the vehicle 30.

FIG. 1 depicts an example vehicle 30, such as a robotic firefighting vehicle. Vehicle 30 includes one or more wheels 32. In some embodiments, wheels 32 may be mounted on a track (not depicted), such as a metal or rubber belt with a grooved exterior surface to provide improved traction. Vehicle 30 also includes at least one side wall 34 with a lever 36 protruding therefrom to allow a user to disengage the failsafe brake. Lever 36 is operable at either a first position 44a (FIGS. 2A, 3A, 4) or a second position 44b (FIGS. 2B, 3B). This is better illustrated in FIGS. 2A, 2B, 3A, 3B, and 4.

Figure 2A:
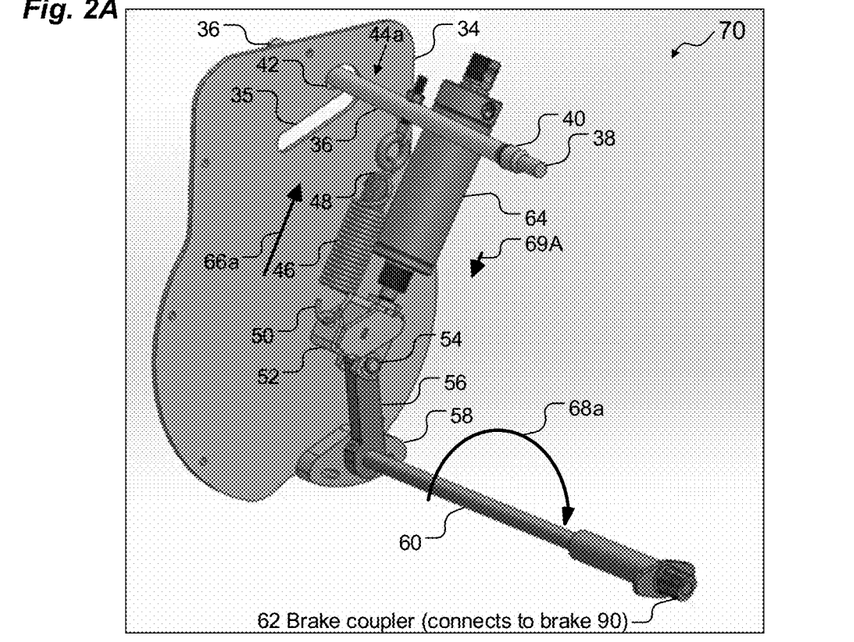
FIG. 2A is a perspective view of an example arrangement for overriding a failsafe brake in a vehicle. In this view, a manual lever is placed in a first position in which the failsafe brake is operative when power to the vehicle is lost or turned off.
Figure 2B:
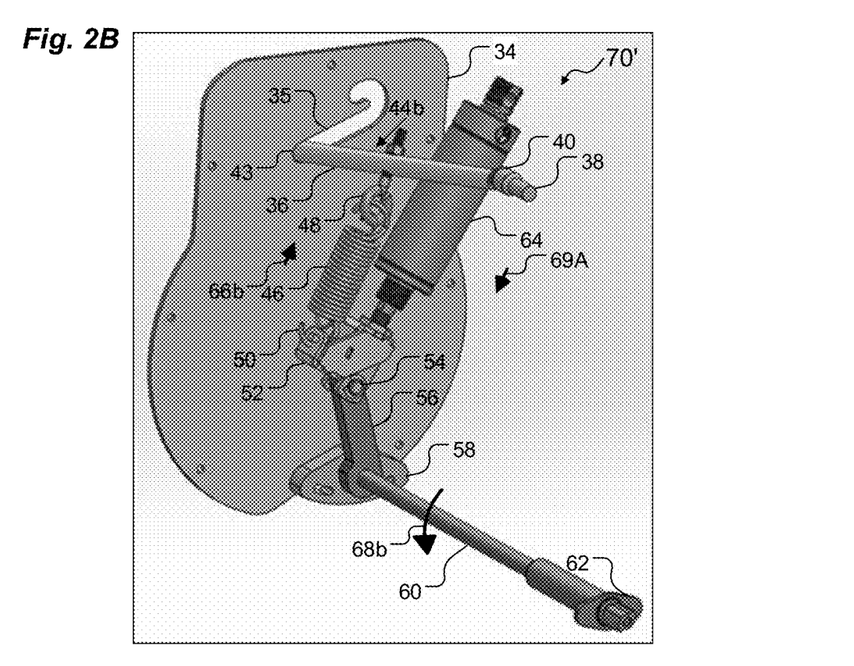
FIG. 2B is a perspective view of the arrangement of FIG. 2A, but with the manual lever placed in the second position in which the failsafe brake is defeated.
Figure 3A:
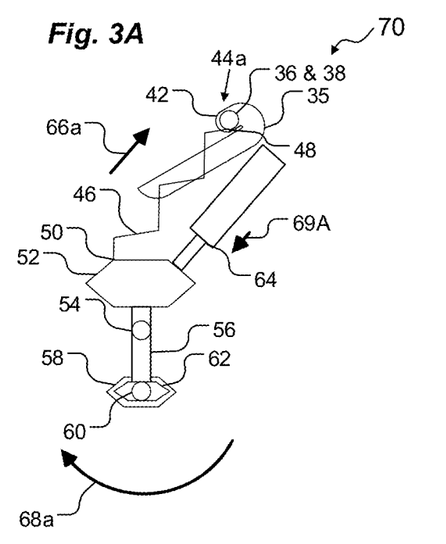
FIG. 3A is a block diagram depicting a simplified head-on view of the arrangement of FIG. 2A.
Figure 3B:
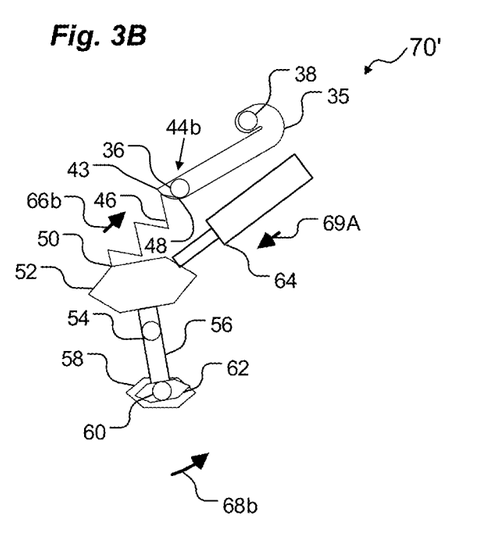
FIG. 3B is a block diagram depicting a simplified head-on view of the arrangement of FIG. 2B.

FIGS. 2A and 3A depict different views of an example arrangement 70 of an overridable failsafe brake apparatus. In this arrangement 70, lever 36 is disposed in a first position 44a that induces a tension 66a in a spring 46, while an actuator (depicted as a hydraulic cylinder 64) is unpowered, providing little or no force 69A in opposition to the tension 66a of the spring 46. Arrangement 70 may result from a situation in which a vehicle 30 loses power (e.g., by being shut off or running out of power), or from a situation in which the operator of the vehicle 30 desires to engage the braking system.

Lever 36 is mounted at a fixed mounting point 38. In some embodiments, fixed mounting point 38 is affixed to another wall of the vehicle 30 opposite wall 34. Although in some embodiments, lever 36 may operate with a single degree of freedom, as depicted, lever 36 has at least two degrees of freedom. In such embodiments, lever 36 may be affixed to the fixed mounting point 38 by means of a ball joint 40, for example. A user outside of the structure of the vehicle 30 is able to grab the lever 36 and dispose it at first position 44a by resting the lever 36 at a first stable point 42 in a channel 35 within side wall 34. In this arrangement 70, lever 36 pulls on spring 46, inducing tension 66a. As depicted, lever 36 is mounted to a first end of the spring 48, while a second end 50 of the spring 46 is mounted to a bracket 52. Hydraulic cylinder 64 is also mounted to the bracket 54 in a substantially parallel direction, although, since in this arrangement 70, the hydraulic cylinder 64 is unpowered, it applies little to no force 69A on the bracket 52. Bracket 52 attaches to a brake lever 56, which is rotatably affixed to a hinge joint 54. Tension 66a causes the spring 46 to pull on the bracket 52, causing the brake lever 56 to rotate around the hinge joint 54, inducing a clockwise torque 68a in a brake shaft 60 affixed to the brake lever 56. If this clockwise torque 68a is strong enough, then, even against slight countervailing force 69A, it will cause brake coupler 62 to rotate clockwise and engage a brake 90, such as a drum brake. In one embodiment, the brake 90 will engage only if the clockwise torque 68a exceeds an activation torque, and the spring 46 is configured to provide just enough tension 66a to induce that activation torque, even against slight countervailing force 69A.

FIGS. 2B and 3B depict different views of another example arrangement 70' of the same overridable failsafe brake apparatus from FIGS. 2A, 3A. In this arrangement 70', lever 36 is disposed in a second position 44b that induces a reduced tension 66b in the spring 46, while the hydraulic cylinder 64 remains unpowered, providing little or no force 69A. Arrangement 70' may result from a situation in which a vehicle 30 has lost power (e.g., by being shut off or running out of power), but the operator of the vehicle 30 desires to disengage the braking system (e.g., to tow the vehicle 30).

A user outside of the structure of the vehicle 30 is able to grab the lever 36 and dispose it at the second position 44b by resting the lever 36 at a second stable point 43 in the channel 35. In this arrangement 70', lever 36 does not pull significantly on spring 46, inducing a reduced tension 66b. In some embodiments, as depicted, reduced tension 66b may be in the same direction as tension 66*a* but having a greatly attenuated strength, while in other embodiments, reduces tension 66*b* may have zero strength or a slight strength in the opposite direction. In any event, reduced tension 66*b* is insufficient to exert enough torque on the brake shaft 60 to engage the brake 90. As depicted, the torque 68*b* exerted on the brake shaft 60 by the combination of reduced tension 66*b* of the spring 46 and the mild force 69A of the unpowered hydraulic cylinder 64 is now slightly in the counterclockwise direction, resulting in the brake 90 no longer being engaged by the brake coupler 62. In some embodiments, not depicted, the resultant torque 68*b* on the brake shaft 60 may be zero or still clockwise, but below the activation torque.

Comparing FIGS. 3A and 3B, it can be seen that, in FIG. 3A, brake coupler 62 is aligned with a flange bearing 58 (affixed to the wall 34) on which the brake shaft 60 is mounted, but in FIG. 3B, brake coupler 62 is rotated counterclockwise and no longer in aligned with flange bearing 58.

In some embodiments, as depicted, channel 35 may be J-shaped. This configuration allows the lever 36 to rest stably at either first stable point 42 or second stable point 43. At points in between, the force of the spring 46 will induce the lever 36 towards either first stable point 42 or second stable point 43. The J shape allows a user to easily push the lever out of the first stable point 42 due to the short travel. It should be understood that although depicted as a J shape, other configurations are also possible, such as an acutely angled V-shape with one side of the V shorter than the other or a right-angled L-shape, for example.

Figure 4:
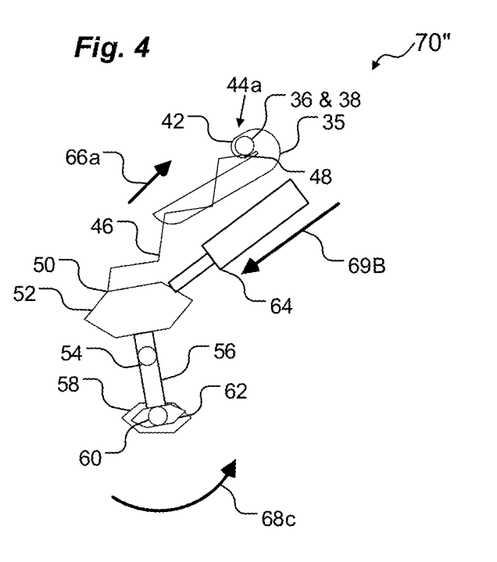
FIG. 4 is a block diagram depicting a simplified head-on view of an example arrangement as in FIG. 3A, but with an actuator powered on by the vehicle. In this view, regardless of the position of the manual lever, the failsafe brake is disengaged.
Figure 5:
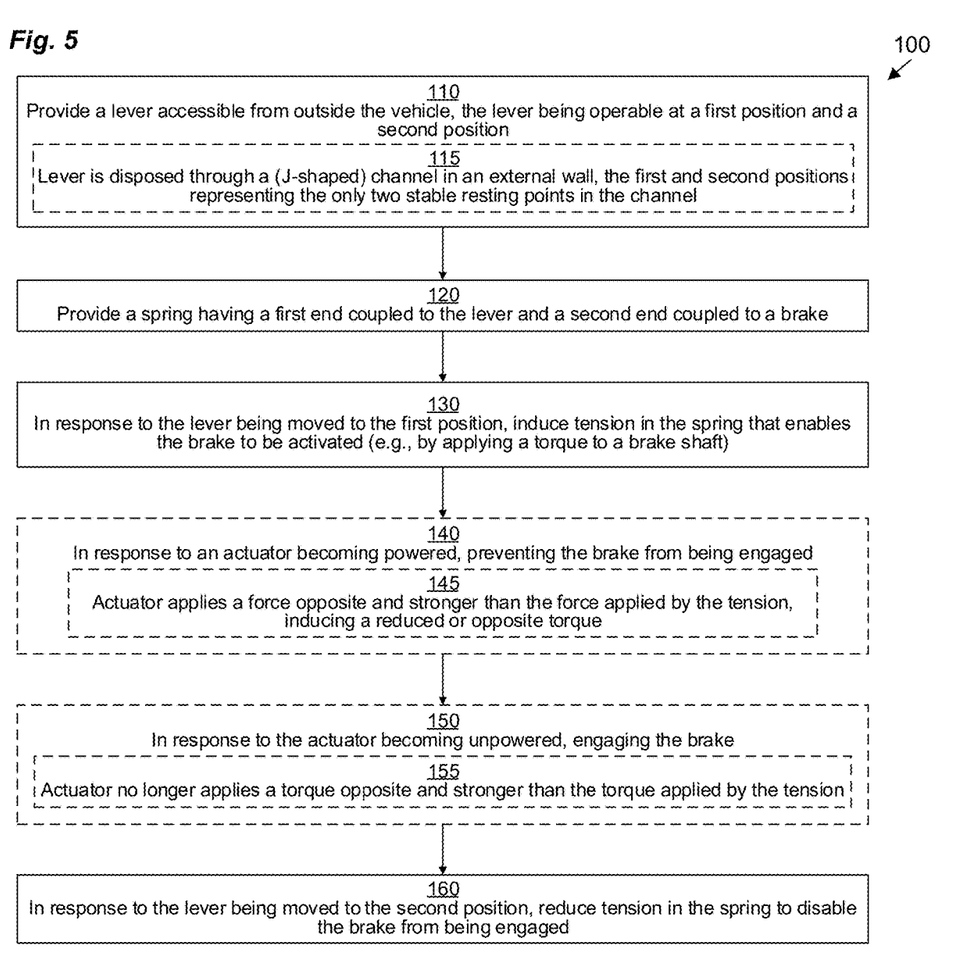
FIG. 5 is a flowchart depicting an example procedure according to various embodiments.

FIG. 4 depicts a view of another example arrangement 70" of the same overridable failsafe brake apparatus from FIGS. 2A, 2B, 3A, 3B. In this arrangement 70", lever 36 is disposed in the first position 44*a*, as in FIGS. 2A, 3A, inducing the same tension 66*a* in spring 46, but now, the actuator (depicted as a hydraulic cylinder 64) is powered, providing a much larger force 69B in opposition to the tension 66*a* of the spring 46. Arrangement 70 may result from a situation in which a vehicle 30 is powered and possibly in motion.

Since hydraulic cylinder 64 is powered, it applies significant force 69B on the bracket 52. Although tension 66*a* causes the spring 46 to pull on the bracket 52, inducing some clockwise torque in the brake shaft 60, since the force 69B of the hydraulic cylinder 64 is larger than the tension 66*a* and in the opposite direction, the overall torque 68*c* induced in the brake shaft 60 is now in the counterclockwise direction, resulting in the brake 90 not being engaged by the brake coupler 62. In some embodiments, not depicted, the resultant torque 68*c* on the brake shaft 60 may be zero or still clockwise, but below the activation torque.

It should be understood that although spring 46 and hydraulic cylinder 64 are depicted as being coupled to a brake shaft 60 that controls a drum brake by inducing various torques 68*a*, 68*b*, 68*c* in the brake shaft 60, other arrangements are also possible. For example, spring 46 and hydraulic cylinder 64 may instead induce linear forces in either the same or opposite direction on a brake actuator that controls a disc brake.

FIG. 6 illustrates an example method 100. It should be understood that one or more of the steps or sub-steps of method 100 may be omitted in some embodiments. Similarly, in some embodiments, one or more steps or sub-steps may be combined together or performed in a different order. Dashed lines indicate that a step or sub-step is either optional or representative of alternate embodiments or use cases.

In step 110, a vehicle 30 provides a lever 36 accessible from outside the vehicle 30, the lever 36 being operable at a first position 44*a* and a second position 44*b*. In some embodiments, step 110 is realized by sub-step 115, in which the lever 36 is disposed through a channel (such as J-shaped channel 35) in an external wall 34 of the vehicle 30, the first and second positions 44*a*, 44*b* representing the only two stable resting points in the channel 35.

In step 120, vehicle 30 provide a spring 46 having a first end 48 coupled to the lever 36 and a second end 50 coupled to a brake 90. It should be understood that this coupling may be indirect, such as via bracket 52, brake lever 56, brake shaft 60, and brake coupling 62.

In step 130, in response to the lever 36 being moved to the first position 44*a*, the positioning induces a tension 66*a* in the spring 46 that enables the brake 90 to be activated (e.g., by applying a torque 68*a* to a brake shaft 60). See FIGS. 2A, 3A.

In some embodiments, optional steps 140, 150 may be performed next.

In step 140, in response to an actuator 64 becoming powered, actuator 64 prevents the brake 90 from being engaged. In some embodiments, step 140 is realized by sub-step 145, in which the actuator 64 applies a force 69B opposite and stronger than the force applied by the tension 66*a*, inducing a zero, opposite, or reduced torque 68*c*. See FIG. 4.

In step 150, in response to an actuator 64 becoming unpowered, actuator 64 causes the brake to engage. In some embodiments, step 140 is realized by sub-step 155, in which the actuator 64 no longer applies the force 69B opposite and stronger than the force applied by the tension 66*a*, instead applying a reduced or zero force 69A. This again induces torque 68*a*. See FIGS. 2A, 3A.

Finally, in step 160, in response to the lever 36 being moved to the second position 44*b*, the positioning induces a reduced tension 66*b* in the spring 46 to disable the brake 90 from being engaged (e.g., by applying a zero, opposite, or reduced torque 68*b* to brake shaft 60). See FIGS. 2B, 3B.

Thus, techniques have been presented techniques for providing a manual lever 36 accessible from outside of a vehicle 30. The lever 36 is user-operable between a first position 44*a* and a second position 44*b*. When the lever 36 is in the first position 44*a*, the failsafe brake behaves normally, engaging when the vehicle 30 is powered off or loses power and disengaging when power is restored. But when the lever 36 is in the second position 44*b*, the failsafe brake is defeated, remaining disengaged even when there is no power.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. In addition, an identification herein of a particular element, feature, or act as being a "first" such element, feature, or act and another particular element, feature, or act as being a "second" such element, feature, or act should be construed as requiring that the "first" and "second" elements, features, or acts are different from each other, unless specified otherwise. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, it should be understood that all embodiments which have been described may be combined in all possible combinations with each other, except to the extent that such combinations have been explicitly excluded.

Furthermore, Applicant makes no admission that any technique, method, apparatus, or other concept presented in this document is prior art under 35 U.S.C. § 102 or 35 U.S.C. § 103, such determination being a legal determination that depends upon many factors, not all of which are known to Applicant at this time.

What is claimed is:

1. An overridable failsafe brake apparatus for a vehicle, the overridable failsafe brake apparatus comprising:
   a lever accessible from outside the vehicle, the lever being operable at a first position and a second position;
   a brake;
   a spring having a first end coupled to the lever and a second end coupled to the brake; and
   an actuator that disengages the brake when powered but allows the brake to be engaged when not powered,
   wherein the lever disposed in the first position is configured to induce tension in the spring that enables the brake to be activated, and the lever disposed in the second position is configured to reduce tension in the spring to disable the brake from being engaged,
   wherein with lever in the first position, a loss of power to the actuator enables the spring to engage the brake, and
   wherein with the lever in the second position, a loss of power to the actuator does not enable the spring to engage the brake.

2. The overridable failsafe brake apparatus of claim 1, further comprising a channel in an external wall of the vehicle, the lever extending through the channel, wherein the lever disposed in the first position rests against the channel at a first stable location of the channel and the lever disposed in the second position rests against the channel at a second stable location of the channel.

3. The overridable failsafe brake apparatus of claim 2 wherein the channel has a J shape, the J-shaped channel extending in a first direction from a first terminus and turning in a reverse direction, opposite the first direction, before ending in a second terminus, wherein the first stable location is disposed at the first terminus of the J-shaped channel, and the second stable location is disposed at the second terminus of the J-shaped channel.

4. The overridable failsafe brake apparatus of claim 3, further comprising a ball joint mounted at a location fixed to the vehicle, one end of the lever being mounted at the ball joint.

5. The overridable failsafe brake apparatus of claim 4 wherein the location of the ball joint is located on another wall of the vehicle opposite the external wall of the vehicle.

6. The overridable failsafe brake apparatus of claim 1, wherein the actuator is operable in a powered state and an unpowered state, the actuator having an end coupled to the brake, wherein the actuator disposed in the powered state is configured to induce a force on the brake that disables the brake from being engaged, and the actuator disposed in the unpowered state is configured to not induce the force on the brake, enabling the brake to be activated.

7. The overridable failsafe brake apparatus of claim 6,
   wherein the overridable failsafe brake apparatus further includes a brake shaft;
   wherein the tension induced in the spring when the lever is disposed in the first position is configured to apply a first torque in a first direction to the brake shaft; and
   wherein the force induced by the actuator when the actuator is disposed in the powered state is configured to apply a second torque in a second direction opposite the first direction to the brake shaft, the second torque exceeding the first torque.

8. The overridable failsafe brake apparatus of claim 1, wherein the actuator and the second end of the spring are each coupled to the brake via a brake shaft, the brake shaft being rotatable to engage and disengage the brake.

9. A method of operating an overridable failsafe brake apparatus for a vehicle, the method comprising:
   providing a lever accessible from outside the vehicle, the lever being operable at a first position and a second position; and
   providing a spring having a first end coupled to the lever and a second end coupled to a brake;
   in response to the lever being moved to the first position, inducing tension in the spring that enables the brake to be activated; and
   in response to the lever being moved to the second position, reducing tension in the spring to disable the brake from being engaged,
   wherein an actuator has an end coupled to the brake, and wherein, in response to the actuator being powered, the method further comprises the actuator applying a force to the brake that disables the brake from being engaged,
   wherein the tension induced in the spring when the lever is disposed in the first position applies a first torque in a first direction to a brake shaft; and
   wherein the force induced by the actuator when the actuator is disposed in the powered state applies a second torque in a second direction opposite the first direction to the brake shaft, the second torque exceeding the first torque.

10. The method of claim 9, further comprising providing a channel in an external wall of the vehicle, the lever extending through the channel, wherein the lever disposed in the first position rests against the channel at a first stable location of the channel and the lever disposed in the second position rests against the channel at a second stable location of the channel.

11. A vehicle comprising:
   a body;
   a brake;
   a lever accessible from outside the vehicle, the lever extending from inside the body to outside the body, the lever being operable at a first position and a second position;
   a spring having a first end coupled to the lever and a second end coupled to the brake;

an actuator operable in a powered state and an unpowered state, the actuator having an end coupled to the brake, wherein the actuator disposed in the powered state is configured to induce a force on the brake that disables the brake from being engaged, and the actuator disposed in the unpowered state is configured to not induce the force on the brake, enabling the brake to be activated; and a brake shaft, wherein the lever disposed at the first position is configured to induce tension in the spring that enables the brake to be activated, and wherein the lever disposed at the second position is configured to reduce tension in the spring to disable the brake from being engaged, wherein the tension induced in the spring when the lever is disposed in the first position is configured to apply a first torque in a first direction to the brake shaft; and wherein the force induced by the actuator when the actuator is disposed in the powered state is configured to apply a second torque in a second direction opposite the first direction to the brake shaft, the second torque exceeding the first torque.

12. The vehicle of claim 11, further comprising a channel in an external wall of the vehicle, the lever extending through the channel, wherein the lever disposed in the first position rests against the channel at a first stable location of the channel and the lever disposed in the second position rests against the channel at a second stable location of the channel.

13. The vehicle of claim 12 wherein the channel has a J shape, the J-shaped channel extending in a first direction from a first terminus and turning in a reverse direction, opposite the first direction, before ending in a second terminus, wherein the first stable location is disposed at the first terminus of the J-shaped channel, and the second stable location is disposed at the second terminus of the J-shaped channel.

14. The vehicle of claim 13, further comprising a ball joint mounted at a location fixed to the vehicle, one end of the lever being mounted at the ball joint.

15. The vehicle of claim 14 wherein the location of the ball joint is located on another wall of the vehicle opposite the external wall of the vehicle.

16. The vehicle of claim 11, further comprising a power source, the power source being configured to:

power operation of the vehicle and power the actuator while the vehicle remains powered.

17. An overridable failsafe brake apparatus for a vehicle, the overridable failsafe brake apparatus comprising:

a lever accessible from outside the vehicle, the lever being operable at a first position and a second position;

a brake;

a spring having a first end coupled to the lever and a second end coupled to the brake; and an actuator configured to disengage the brake when powered but to allow the brake to be engaged when not powered, wherein the lever disposed in the first position is configured to induce tension in the spring that enables the brake to be activated, and the lever disposed in the second position is configured to reduce tension in the spring to disable the brake from being engaged, and wherein the actuator and the second end of the spring are each coupled to the brake via a brake shaft, the brake shaft being rotatable to engage and disengage the brake.

* * * * *